United States Patent [19]

Beckhausen

[11] Patent Number: 5,072,080
[45] Date of Patent: Dec. 10, 1991

[54] SAFETY EDGE SWITCH

[76] Inventor: Karlheinz Beckhausen, Konradstrasse 15, D-5000 Cologne 41, Fed. Rep. of Germany

[21] Appl. No.: 546,429

[22] Filed: Jun. 29, 1990

[30] Foreign Application Priority Data

Jun. 30, 1989 [DE] Fed. Rep. of Germany ....... 3921533

[51] Int. Cl.$^5$ .................. H01H 3/16; H01H 1/02; E06B 9/00; F16P 3/00
[52] U.S. Cl. .................. 200/61.43
[58] Field of Search .............. 200/61.43, 61.44, 86 R

[56] References Cited

U.S. PATENT DOCUMENTS 4,684,768  8/1987  Sackmann et al. .............. 200/61.43

FOREIGN PATENT DOCUMENTS 53382    9/1935   Denmark ................. 200/61.43
2544162  4/1977   Fed. Rep. of Germany ... 200/61.43
3304400  8/1984   Fed. Rep. of Germany .
197712   12/1977  U.S.S.R. .................. 200/61.43

Primary Examiner—J. R. Scott
Attorney, Agent, or Firm—Charles L. Schwab

[57] ABSTRACT

Safety edge switch for power-actuated devices such as roller gates, roller grilles, lifting platforms and working platforms as well as for securing movable objects and machines having a hollow elastic profile, which exhibits, at least on its inner side, surfaces that are electrically conductive by virture of admixtures of conductive substances, such as carbon black, graphite and metal powder, mutual contact of the electrically conductive surfaces leading to a switching pulse. The hollow body exhibits in the interior at least two strip-like, electrically conductive projections and at least one opposing surface, likewise electrically conductive, guided along the hollow body, by which means contacting between the electrically conductive surfaces is improved. The use of multiple electrically conductive projections insures adequate electrical contact between the conductive projections and the opposed conductive surface even when the operating force is applied from various directions.

12 Claims, 5 Drawing Sheets

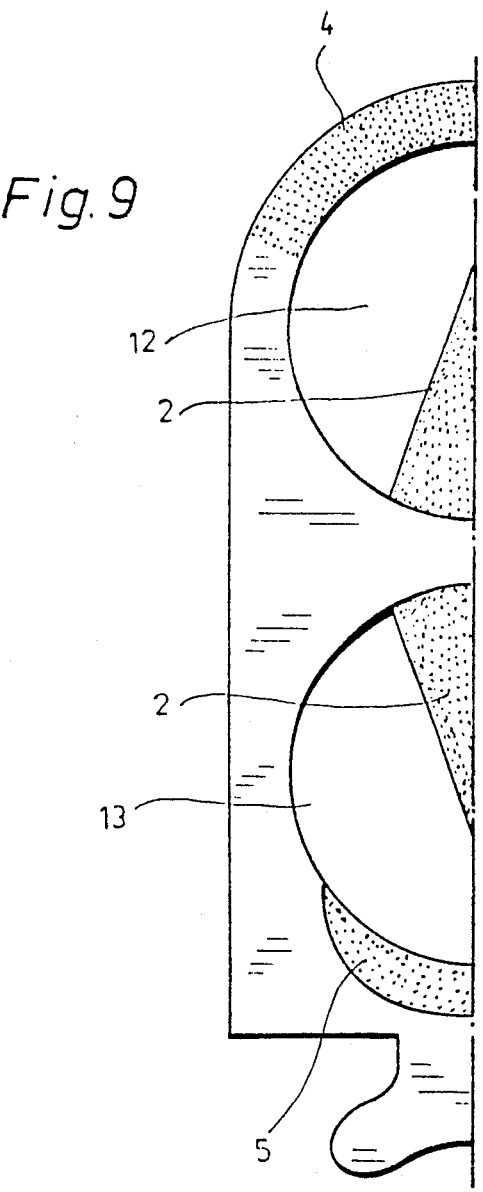
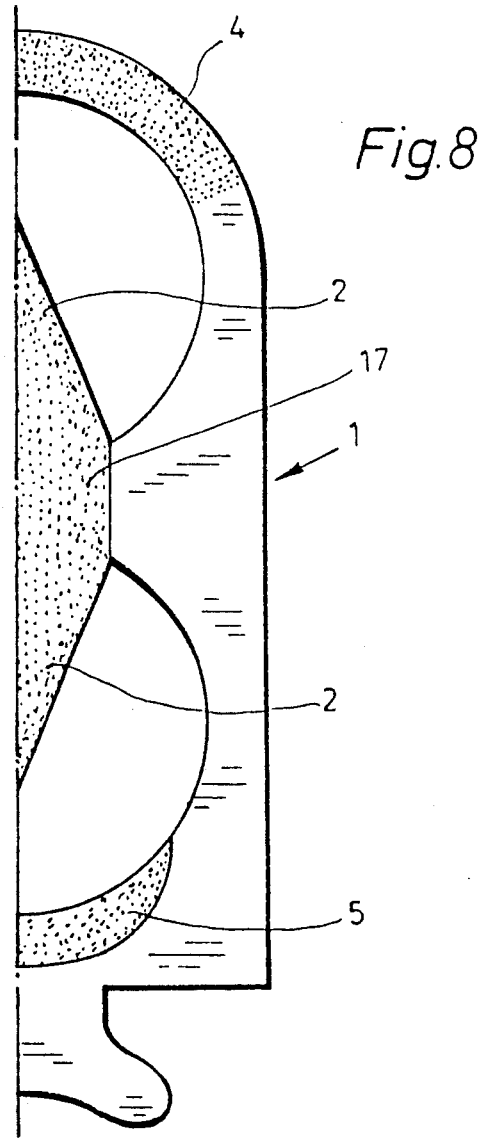
Fig. 9
Fig. 8

SAFETY EDGE SWITCH

TECHNICAL FIELD

This invention relates to a safety edge switch for power-actuated devices such as roller gates, roller grilles, etc., and lifting platforms, working platforms and the like, as well as for securing movable objects, machines or spaces, having a hollow elastic profile, preferably a hollow rubber profile, which exhibits at least on its inner side surfaces that are electrically conductive by virtue of admixtures of conductive substances, such as carbon black, graphite, metal powder and the like, mutual contact of said electrically conductive surfaces leading to a switching pulse.

PRIOR ART STATEMENT

A safety edge switch of the type cited, having a corresponding hollow profile, is known from Federal German patent document DE 33 04 400 A1. The fundamental design of the hollow profile has also proved favorable. Depending on the application of force or the direction of force, however, improved contacting in the hollow profile might be desirable.

OBJECTS AND SUMMARY OF THE INVENTION

It is therefore an object of the present invention to improve the hollow profile so that yet more reliable contacting and thus pulse initiation by the hollow profile is insured. In addition, a further deformation path after pulse initiation is to be provided as appropriate. The object of the invention is achieved by virtue of the fact that the hollow profile exhibits at least two strip-like, electrically conductive projections in the interior and at least one likewise electrically conductive opposing surface guided along the hollow profile, the mutual contact of said projections and said opposing surface initiating switching pulses. The strip-like projections can be insulated from each other by nonconductive intermediate layers. They can, however, also form an electrically conductive unit. By means of this development of the invention, if the hollow profile is sufficiently compressed, multiple contacting takes place inside the hollow profile, since the strip-like projections, in accordance with their number, permit a plurality of electrical contactings with the opposing surface. Depending on the design of the strip-like projections and their separation by insulating intermediate layers, contacting between the strip-like projections, via the opposing surface if applicable, is also possible in the case of an appropriate electrical connection. Depending on the spatial configuration, a plurality of strip-like projections can also be arranged one next to another. The opposing surface can also exhibit corresponding strip-like projections so that a tooth-like engagement of the mutually contacting opposing surfaces occurs, with a rubbing motion taking place as well, which improves or facilitates contacting.

In one embodiment of the invention, two strip-like projections after the fashion of ribs are advantageously provided, which projections are opposed by a profile strip partially protruding from the inner surface of the hollow profile so that a free, undeformed inner cross section of the hollow profile, roughly in the shape of a three-leaf clover, results. Thus, advantageous contacting occurs both upon lateral application of force and upon central application of force, double contacting being advantageously insured. Furthermore, it is insured that, after contacting, a further deformation path remains available without the material of the hollow profile itself being squeezed together.

The profile strip can also have a substantially circular cross section and be arranged inside the hollow profile via one or a plurality of webs a distance away from the inner wall, a displacement of the profile strip to the optimal position, in the center for example, being possible by this means. The profile strip can preferably have a plurality of strip-like projections on its surface, so that, in the case of an appropriate opposing surface, the tooth engagement described, with rubbing motion, occurs here as well.

In further development of the invention, it is proposed that a substantially U-shaped groove be provided on the opposing side of the profile strip, inward protruding strip-like projections being provided on the lateral flanks of said groove. The distance between these protruding strip-like projections can be smaller than the cross section of the profile strip so that two distinct effects are thus created. For one, when the complete inner surface or a majority of said inner surface of the undercut groove is electrically conductive, particularly intensive contacting occurs between the profile strip and the protruding strip-like projections in the U-shaped profile. For another, hooking of the profile strip inside the U-shaped profile takes place behind the protruding strip-like projections. It can thus be determined immediately and by simple means where a compression of the hollow profile and an initiation of the pulse has taken place. The hollow profile can then be unlocked again by means of an appropriate pulling force. For this purpose, an outer bead is advantageously provided on the hollow profile, by means of which bead the hollow profile can be unlocked. Unlocking can also be accomplished by means of an overpressure in the interior of the profile. Furthermore, the profile strip is also guided, depending on the length of the flanks of the U-shaped profile.

Favorable double contacting also occurs when the hollow rubber profile exhibits two chambers arranged parallel to each other, with strip-like, electrically conductive projections being provided between the chambers and extending into both, electrically conductive opposing surfaces in the chambers being correlated with said projections. Here the surfaces can also be provided with a plurality of strip-like projections. In the case of this hollow profile, contacting can take place, on the one hand, separately one after the other, it being possible to detect these pulses in differentiated fashion, by which means the intensity of the application of force can also be determined, since only one chamber is initiated in the case of a slight application of force while both chambers are initiated in the case of a stronger application of force. In that case each chamber is separately connected to its evaluation unit. However, the strip-like projections extending into both chambers can also form an electrically conductive unit with a continuous conductive cross section so that only one connecting line is necessary. Furthermore, this unit can also exist with no electrical connection. In that case contacting of one opposing surface to the other takes place via the unit arranged therebetween, but not until both chambers are deformed, i.e., after a relatively long deformation path.

In order to make available a sufficiently large cross section for the electrical conductivity, it is proposed to make the strip-like, electrically conductive projections or profile strips and the electrically conductive opposing surfaces electrically conductive over their entire wall thickness by means of admixtures, and also to make the projection cross section or the profile strip cross section, up to the walls of the hollow profile, comprehensively electrically conductive. The hollow profiles may advantageously have tongue-and-groove-shaped undercut profiles preferably on opposite outer sides, said profiles fitting one into the other, by means of which profiles a plurality of hollow profiles can be fastened to one another so that a two-chamber or multichamber profile can be fabricated with a uniform hollow profile.

BRIEF DESCRIPTION

For further explanation of the invention, reference is made to the drawings, which illustrate a plurality of exemplary embodiments of the invention in simplified form.

FIGS. 8 and 9 show a hollow profile with double chamber.

DETAILED DESCRIPTION

In FIGS. 1 to 9, insofar as illustrated in detail, the number 1 identifies an elastic hollow body or profile, which includes a hollow chamber and is used as an initiating unit preferably of a safety edge switch, the hollow profile 1 exhibiting surfaces that are electrically conductive by virtue of admixtures of conductive substances such as carbon black, graphite, metal powder and the like, the mutual contact of which surfaces leads to switching pulses in the evaluation unit, which is connected to said surfaces by wires, and by this means stops power-actuated devices or objects of the most varied sort or reverses their direction of motion. It should be pointed out that, depending on the application, the hollow profile can be mounted on both the moving and also the stationary opposing part. The hollow profile can also be used as a protective or safety profile on motor vehicles.

Figure 1:
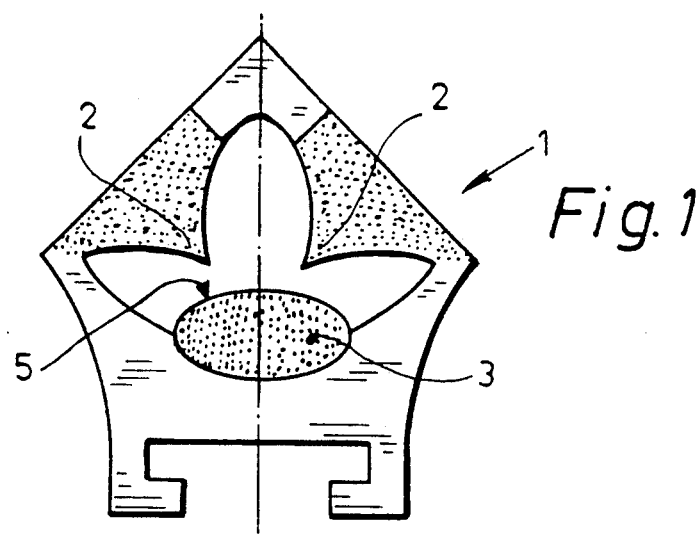
FIGS. 1-3 show in cross section a preferred exemplary embodiment of the hollow profile in various states of deformation.
Figure 2:
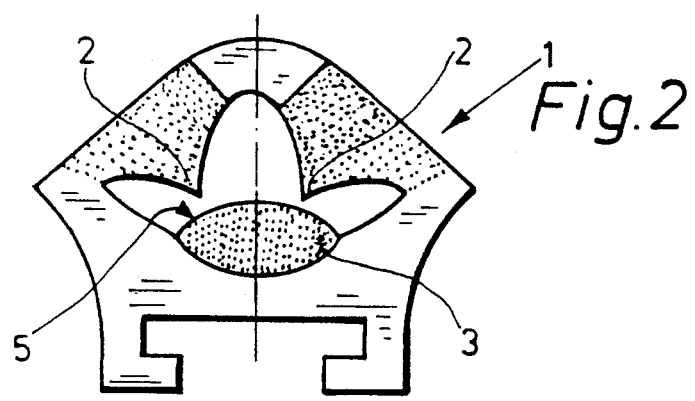
Figure 3:
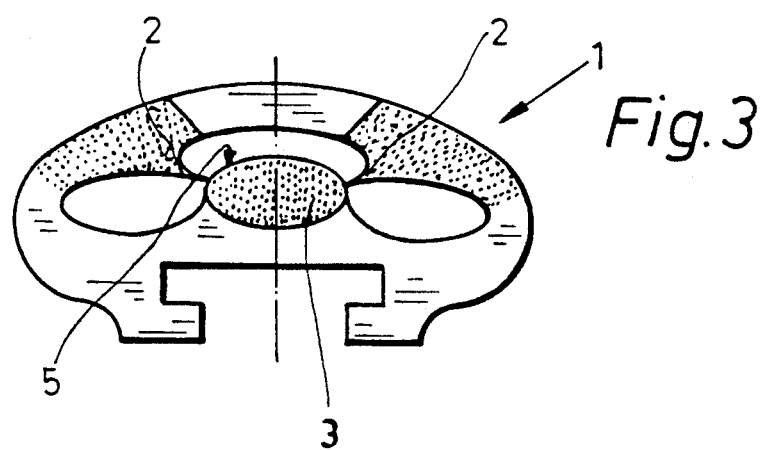

In FIGS. 1 to 3, the hollow profile 1 exhibits two strip-like projections 2, also designated ribs, in its interior. As shown by the stippling in the figures, these form cross sections that are electrically conductive by virtue of the admixture of conductive substances. On the opposite side there is a profile strip, identified as 3, which protrudes only partially out of the inner wall but, as indicated by the stippling, forms an electrically conductive cross section 5. If now the profile, as can be understood from the motion sequence of FIGS. 1 to 3, is compressed, at first one or both of the strip-like projections 2 touch the profile strip 3, thus initiating pulses. It is important that an additional travel path or a further deformation path is possible after pulse initiation without the material of the hollow profile being squeezed together, since the strip-like projections 2 or the rib tips can slide along the profile strip 3 without reaching the root lying opposite. Furthermore, the recess between the strip-like projections 2 or ribs has sufficient free space to allow a run-on. The hollow profile is preferably fabricated from rubber. It need not be so, however, since other plastic materials are also most suitable. The unstippled region of the hollow profile cross section is fabricated from a material that is nonconductive.

Figure 4:
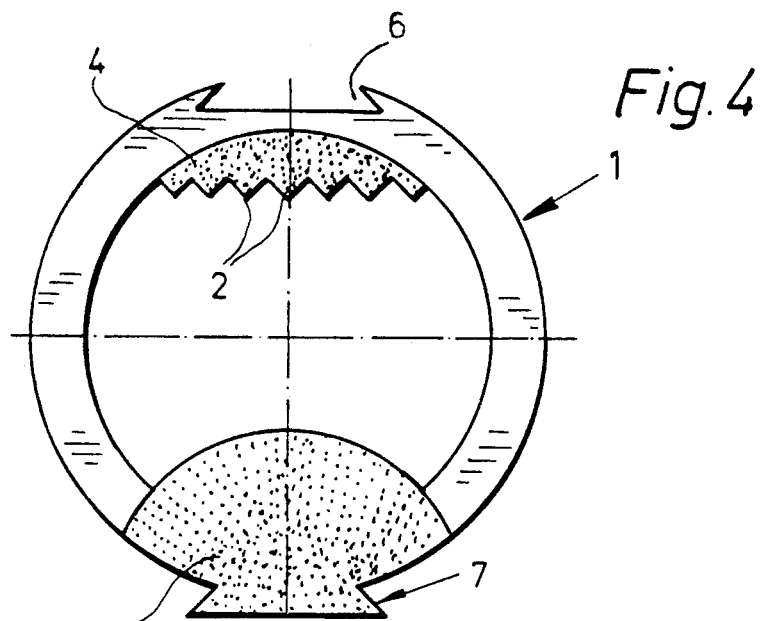
FIGS. 4 and 5 show in cross section individual profiles, which can be assembled into double or multiple profiles.
Figure 5:
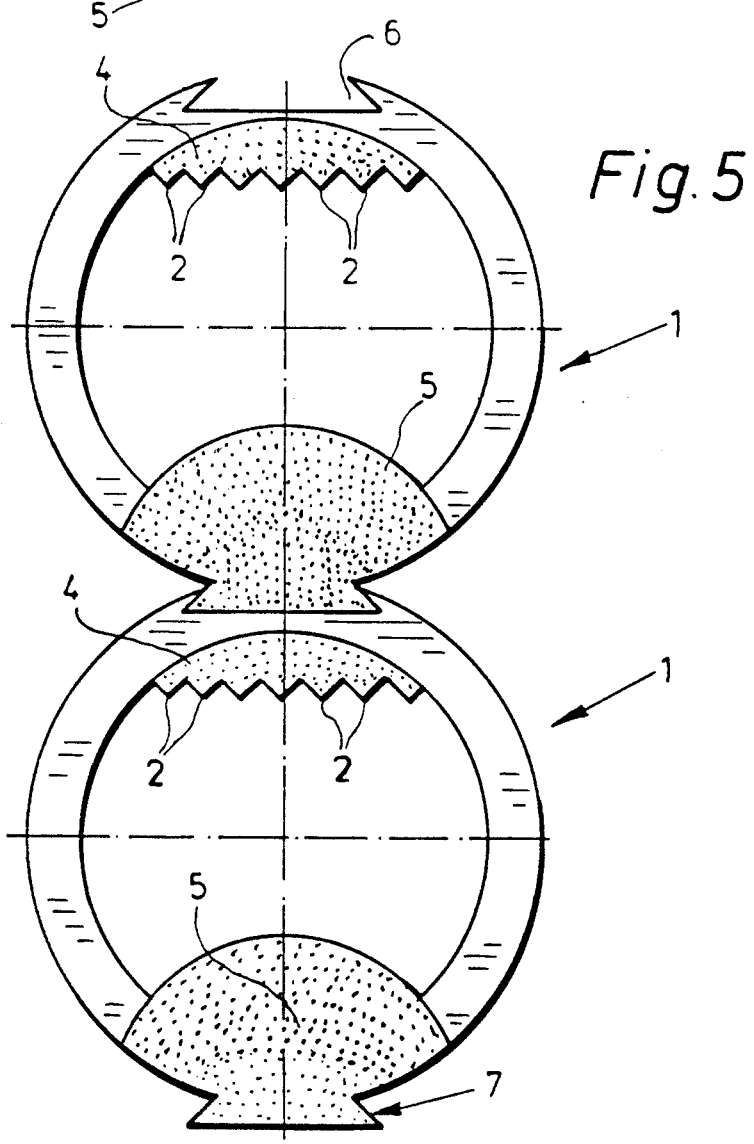

The hollow profile of FIGS. 4 and 5 has a predominantly ring-shaped cross section, conductive cross sections 4 and 5 being provided both in the foot region and in the region lying opposite. The conductive cross section 4 lying opposite the foot likewise exhibits strip-like projections 2. A plurality of projections 2 are provided so that, depending on the contact engagement, multiple contacting takes place. As can be understood from the stippled cross sections 4 and 5, in the hollow profile of FIGS. 4 and 5 it is not only the surfaces but larger regions of the cross section that have been rendered conductive by means of the admixture of conductive substances so that here again the conductivity is increased, or the resistance decreased, along the hollow profile 1. The hollow profile of FIGS. 4 and 5 has grooves, identified by 6, and tongues, identified by 7, so that an attachment of one hollow profile to the other is readily possible, since rigid clamping takes place by means of the undercutting of the tongue-and-groove system. The unstippled region of the hollow profile cross section is fabricated from a material that is nonconductive.

Figure 6:
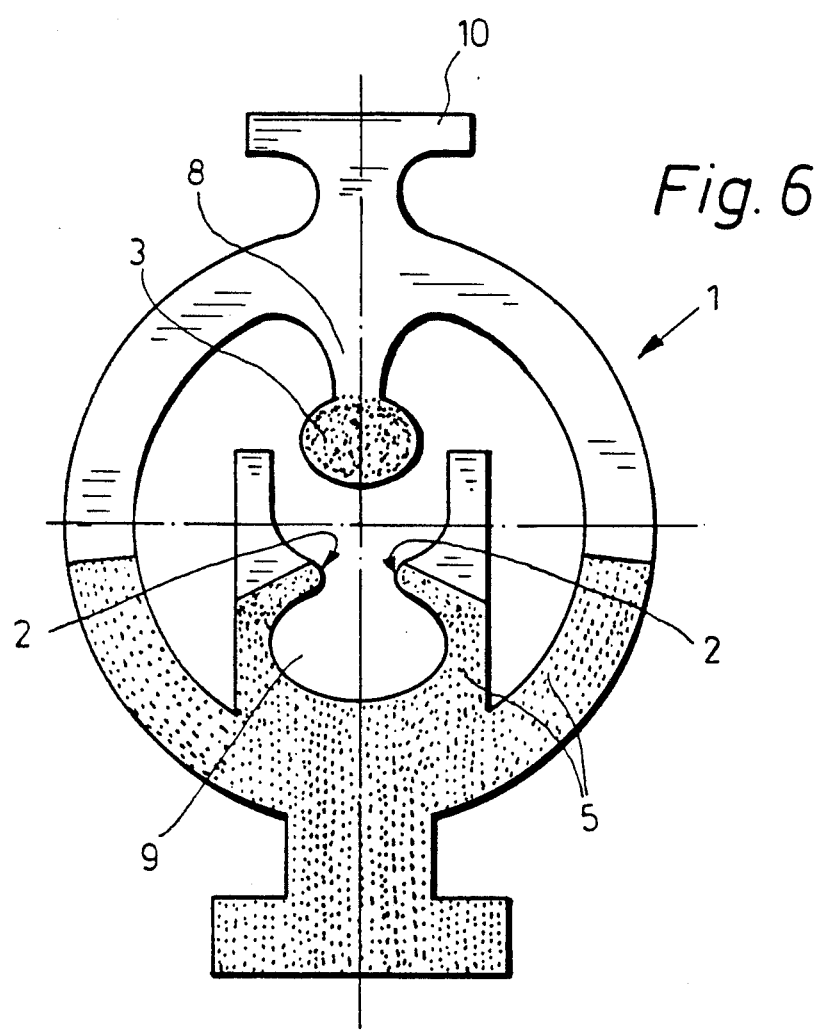
FIG. 6 shows in cross section a hollow profile in which locking is possible in the state of deformation.

The hollow profile of FIG. 6 likewise has a substantially circular cross section and is, as can be understood from the white and stippled areas, partially conductive and partially nonconductive. The profile strip, identified by 3, is completely conductive. It is attached to the hollow profile on a web 8. On the side lying opposite an undercut groove identified by 9 is provided, which exhibits a substantially U-shaped cross section and bears strip-like projections 2 inside the lateral flanks. In this hollow profile, double contacting also takes place between the profile strip 3 and the projections 2 of the undercut groove 9 if said projections also consist of conductive material, as illustrated in FIG. 6. This need not, however, be the case. For example, only the root of the undercut groove 9 can be conductive. Furthermore, hooking of the profile strip 3 behind the strip-like projections 2 also occurs so that it is possible to see visually where the hollow profile has been compressed. Depending on the dimensions of the profile strip 3 and the undercut groove 9, this hooking is more or less strong, or it can also be absent altogether. For easier unhooking of the hollow profile, a bead 10 is provided on the hollow profile in the region of the web 8, by means of which bead the handling of the hollow profile is insured.

Figure 7:
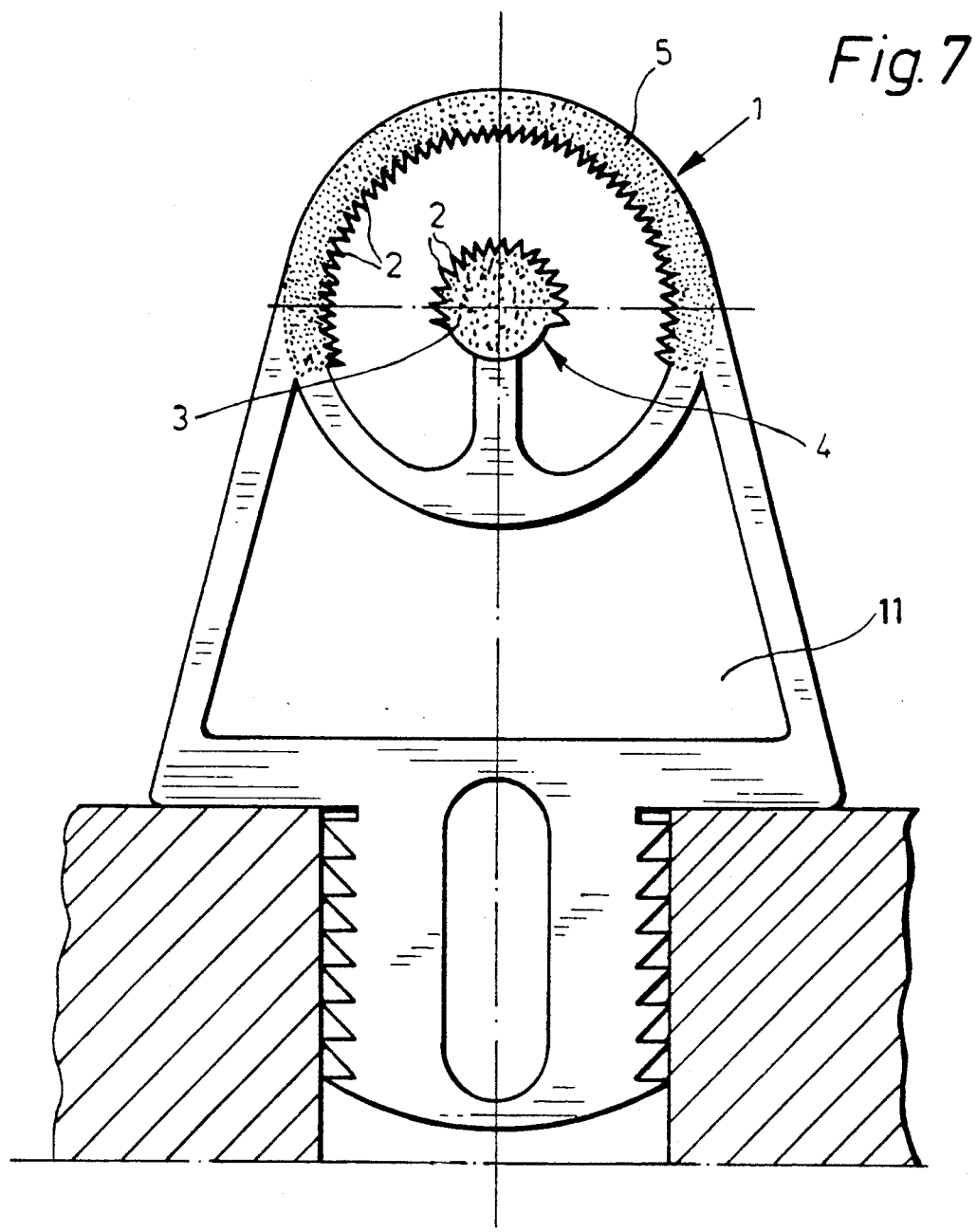
FIG. 7 shows a modified hollow profile with a run-on chamber attached thereto.

The hollow profile of FIG. 7 is likewise fabricated partially from conductive material and partially from nonconductive material, corresponding to the white and stippled areas. The profile strip 3, which is likewise attached to a web 8, is displaced up to the center of the hollow profile 1. It exhibits a plurality of strip-like projections 2, the majority of the hollow profile 1 likewise exhibiting a greater number of strip-like projections 2 on its inner side. In the case of this profile, not only double contacting but multiple contacting takes place between the conductive surfaces upon compression so that secure switching pulses arise under all circumstances. The hollow profile 1 of FIG. 7 further exhibits a run-on chamber 11, which has no switching function. Said chamber, however, is to insure that the movable part of the device can move some way before coming to rest, without the hollow profile being unduly compressed.

The hollow profile 1 of FIGS. 8 and 9 has two chambers 12 and 13, which exhibit a substantially round cross section in the interior. Here too, the conductive and nonconductive cross sections 4 and 5 are illustrated by white areas and stippled areas, respectively. In FIG. 8, a conductive unit 17 is provided between the chambers 12 and 13, said conductive unit exhibiting strip-like projections 2 extending into both chambers 12 and 13, electrically conductive opposing surfaces in the chambers 12 and 13 being correlated with said projections. Depending on the connection of this hollow profile, double contacting can take place if separate wires are connected to all the conductive cross sections 4, 5 and 17 so that a contact of the outer opposing surface with the projection 2 in the chamber 12 and a contact of the projection 2 in the chamber 13 with the other opposing surface initiates a pulse. If only the outer conductive cross sections 4 and 5 are connected to wires and a switching device, then both chambers must be compressed in order to bring about contacting via the unit 17 and the two strip-like projections 2. As can be understood from FIG. 9, the strip-like projections 2 extending into the chambers 12 and 13 are electrically separated from each other, since nonconductive rubber, identified by the white area, is provided between said projections.

The embodiments of the invention in which an exclusive property or privilege is claimed are defined as follows:

1. A safety edge switch of the type having an elastic hollow body with a hollow chamber presenting interior conductive surfaces which develop a switching pulse when brought into mutual contact, characterized by said elastic hollow body (1) having at least two strip-like electrically conductive projections (2) with conductive surfaces extending into said hollow chamber and at least one opposing surface thereon which is electrically conductive and extends along the interior of said hollow chamber whereby switching pulses occur upon mutual contact of said conductive surface of at least one of said projections and said opposing surface.

2. The safety edge switch of claim 1 wherein said strip-like projections (2) are insulated from one another by nonconductive material disposed therebetween.

3. The safety edge switch of claim 1 wherein said strip-like projections (2) form an electrically conductive cross section.

4. The safety edge switch of claim 3 wherein a plurality of at least three strip-like projections (2) are disposed alongside one another.

5. The safety edge switch of claim 1 wherein said projections (2) are in the form of ribs and the inner cross section of said elastic hollow body (1) in its undeformed state has the shape of a three leaf clover.

6. The safety edge switch of claim 1 wherein one of said opposing surfaces is on an electrically conductive cross section (5) in the form of a profile strip (3) at least partially protruding from the inner surface of the hollow chamber of said elastic hollow body (1).

7. The safety edge switch of claim 6 wherein said profile strip (3) has a plurality of strip-like projections (2) on its surface.

8. The safety edge switch of claim 6 wherein said profile strip (3) has a partially circular cross section and is arranged on the inner wall of the hollow chamber of said elastic hollow body (1).

9. The safety edge switch of claim 8 and further comprising a web (8) on an inner wall of said hollow chamber of said elastic hollow body (1) and wherein said profile strip (3) is mounted on said web (8).

10. The safety edge switch of claim 9 and further comprising an undercut groove (9) on the inner side of said hollow chamber of said elastic hollow body (1) lying opposite said profile strip (3), the inner surfaces of said groove being electrically conductive and engaging said profile strip (3) upon deformation of said elastic hollow body (1).

11. The safety edge switch of claim 10 wherein said undercut groove (9) has a substantially U-shaped cross section and inward protruding strip-like projections (2) are formed on the inner sides of the lateral flanges thereof.

12. The safety edge switch of claim 1 wherein said elastic hollow body (1) includes complimentary tongue and groove parts on its opposite interior sides, said parts presenting said conductive surfaces.

* * * * *